April 6, 1948.    R. G. CAMPBELL    2,439,037
ICE REMOVING COVERING FOR AIRCRAFT
Filed March 17, 1944
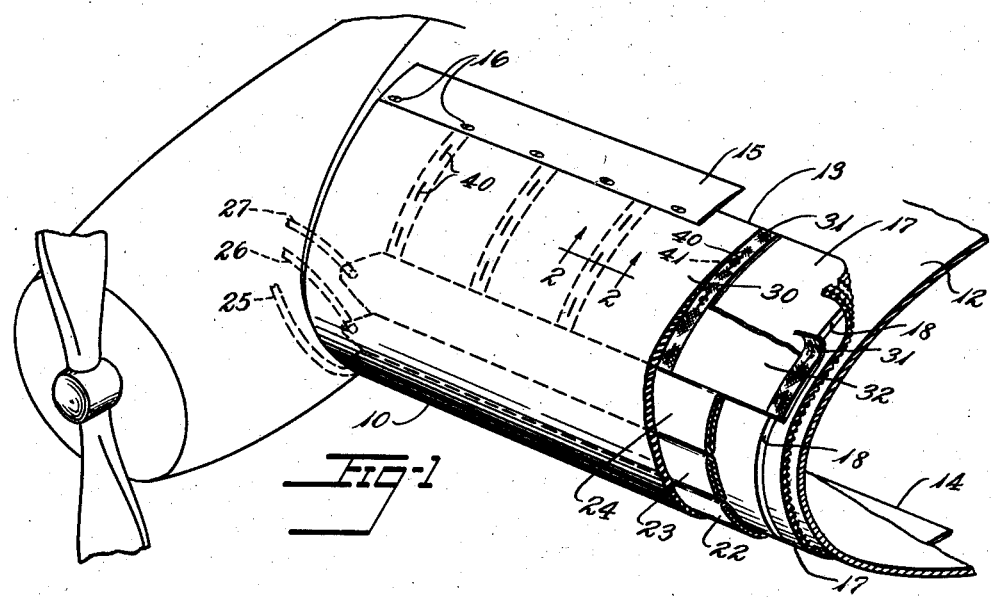
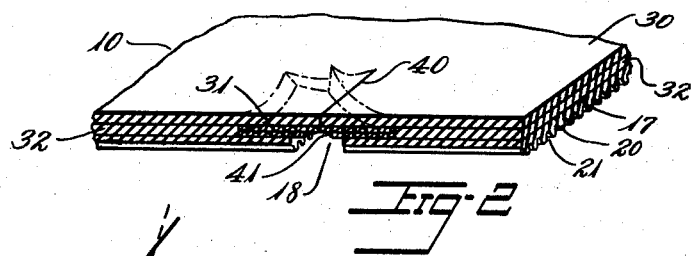
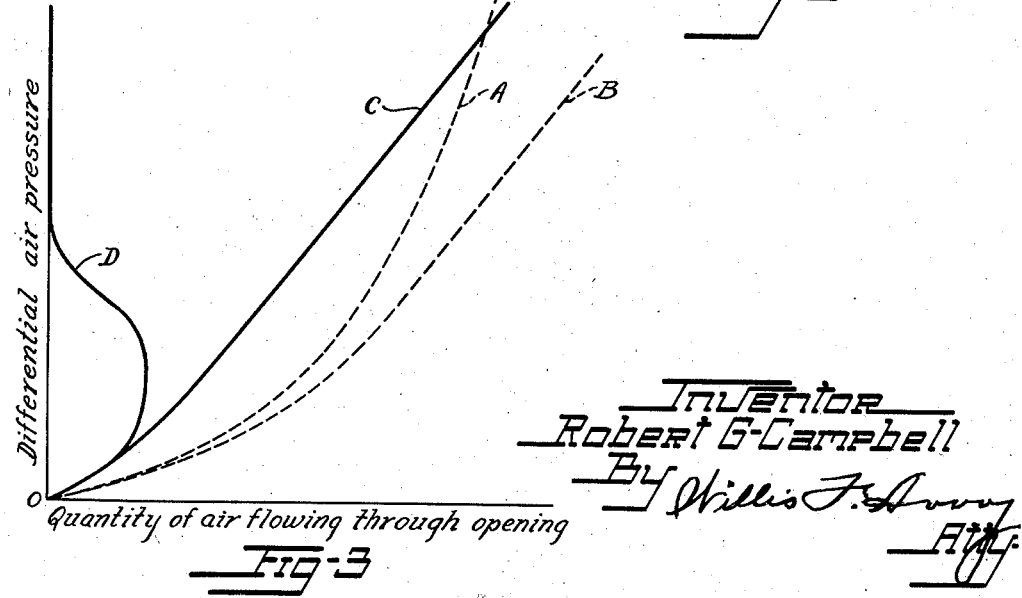
Inventor
Robert G. Campbell Patented Apr. 6, 1948

2,439,037

UNITED STATES PATENT OFFICE 2,439,037

ICE REMOVING COVERING FOR AIRCRAFT

Robert G. Campbell, Cuyahoga Falls, Ohio, assignor to The B. F. Goodrich Company, New York, N. Y., a corporation of New York Application March 17, 1944, Serial No. 526,867

2 Claims. (Cl. 244—134)

This invention relates to protective coverings and is especially useful in its application to inflatable protective coverings for preventing accumulation of ice on the leading edge of wings and other airfoils and surfaces.

An airfoil, for example, a wing of an aircraft in flight, may be functioning under cruising, diving, climbing and stalling conditions respectively, with accompanying variation in the aerodynamic forces at the leading edge of the airfoil and especially in the area of negative pressure produced by the airfoil. When the wing is provided with an inflatable protective covering of flexible material, such, for example, as resilient rubber-like material, this variation in aerodynamic forces tends at times to cause portions of the covering to lift away or to bulge objectionably from the wing surface in areas in which it is not secured directly to such surface.

By the present invention provision is made for removing the air from beneath the covering by improved action whereby the flow is predominantly one-way rather than two-way, thus increasing the ability of the wing cover to maintain itself upon the wing surface and eliminating or reducing the possibility of its lifting or bulging objectionably away from the wing.

An object of the present invention is to provide relatively free passage of air outwardly from the covering and to provide only limited passage of air or total restriction thereof inwardly of the covering.

Other objects are to provide relief for entrapped air during all conditions of flight and at different angles of attack, and to provide for operational effectiveness and high quality of the product.

These and other objects will appear from the following description and the accompanying drawings.

Of the drawings:

Fig. 1 is a perspective view of a portion of an airplane, a wing thereof being shown in section with a protective covering constructed in accordance with and embodying the invention in place thereon, portions of the covering being broken away in steps and a portion being turned back to show the construction.

Fig. 2 is a perspective view of a portion of the covering taken in section on line 2—2' of Fig. 1 and shown to a larger scale.

Fig. 3 is a graph illustrating the action of the slitted opening of the invention in passing air as compared to the action of round holes as used heretofore.

In the embodiment of the invention shown in Figs. 1 and 2 of the drawings, an inflatable protective covering or shoe 10 of elastic construction is mounted upon an airfoil 12, such, for example, as an aircraft wing, the covering being preferably in a stretched condition chordwise of the wing and secured to the wing skin or its underlying supporting structure along upper and lower attaching margins 13 and 14 extending spanwise of the wing. Metal fairing strips 15 may be provided at the attaching margins of the covering 10 to clamp the margins against movement and to provide a smooth transition of surface from the covering 10 to the skin of the wing, and may be secured in place by screws 16.

The protective covering 10 includes an inner layer 17 of elastic rubber-like material. This layer is formed of portions spaced apart spanwise of each other to define air-conducting grooves 18 extending chordwise of the wing from the margins of the protective covering to the inflation tubes, that portion of the layer 17 beneath the inflation tubes being continuous. The layer 17 is formed on its inner surface with spanwise extending ribs 20 between which are grooves 21 communicating with the grooves 18.

Inflation tubes 22, 23, 24 are mounted upon the layer 17 and extend spanwise along the leading edge of the wing. They are adapted to be inflated to distort the covering for removal of ice accretion and are connected to a pressure fluid source (not shown) by tubular connections 25, 26, 27, respectively.

The covering 10 also includes an outer layer 30 of elastic rubber-like material which extends continuously from one margin of the covering to the other chordwise thereof over the inflation tubes 22, 23, 24, and also spanwise from end to end of the covering. The layer 30 may also include at the slits, hereinafter described, a reinforcing layer of woven fabric which may comprise a layer of the reinforcing tape hereinafter mentioned.

Between the layers 17 and 30, strips of lengthwise extensible rubber-impregnated reinforcing tapes 31 of textile material extend chordwise of the wing at spanwise spaced apart intervals from each margin 13, 14 of the covering to a position adjacent the inflating tubes 22, 24 and with each strip overlying one of the grooves 18. Between the tapes 31, the space is filled by portions 32 of elastic rubber-like material equal in thickness to the tapes. The layers 17, 30, and 32 are all secured together by vulcanization to provide a homogeneous body.

To provide free passage of air outwardly through the covering while restricting flow inwardly therethrough, the layer 30 is formed with chordwise slits 40 positioned so as to overlie the tapes 31 and located at spaced-apart positions between the inflatable tubes and the margins 13, 14 of the covering. The tapes 31 are formed with perforations 41 at least through inner fabric layers hereof underlying the slits in communication therewith and overlying and communicating with the grooves 18. An area of the outer layer 30 surrounding each perforation 41 and its corresponding slit 40 is unadhered to the tapes while other portions of the tapes are adhered to the rubber-like material of the layers 17, 30 and 32. This may be accomplished in the construction of the covering by applying a patch of non-adhering material such as Holland cloth over each tape perforation to separate the rubber-like material from the cemented tapes during vulcanization, then slitting the layer 30 after vulcanization, and then removing the non-adhering patch through the slit. The arrangement is such that the tensioning of the covering chordwise closes the slits under compression of the lips of the slits against each other and as the perforation 41 in the tape is of relatively small diameter as compared to the length of the slit the lips are supported by the tape surrounding the aperture except for the portions thereof bridging the perforation, thereby substantially preventing flow of air from without the covering inwardly, while the lips of the slit may flex outwardly, as indicated in dot-and-dash lines in Fig. 2, to offer only relatively low resistance to outward flow of air from beneath the covering. Also the wing surface serves as a backing in the one-way action. The tapes 31 resist tearing of the rubber material due to their strong resistance to tearing and their vulcanization to the layer 30 beyond the valve area underlying the slits.

Referring to Fig. 3 which shows the differential of pressures at opposite faces of the covering plotted against the quantity of air flowing through a round vent opening as compared to that flowing through a slitted vent in accordance with the invention, the curve A shows the flow through the round opening from without the covering to within and the curve B represents the flow through such opening from within the covering to without. The curve C shows flow outwardly through a slitted opening, and it will be seen that flow in this direction is only slightly restricted by the valve slit. The curve D shows flow inwardly through the slitted opening. It will be seen that at very low differential pressures a small quantity of air passes the valve while at higher differential pressures substantially no air passes.

In the operation of the ice removing covering, the tubes 22, 23, 24 are inflated alternately to change the shape of the leading edge and thereby to crack and remove accretion of ice at the leading edge. The inflation of the tubes lifts the portion of the covering between the inflatable tubes and the margins 13, 14 of the covering from the airfoil, stretching the covering chordwise. It has been found that leakage of the valve slits at low differential pressures is beneficial in facilitating rise of the covering from the surface of the airfoil at inflation periods while ready flow of air outwardly through the valve slits provides for quick return of the covering to the surface of the airfoil upon deflation of the tubes and maintenance of the covering against the airfoil between inflations.

While the invention has been illustrated and described in its application to a shoe for preventing accumulation of ice upon the leading edge of a wing, it has utility also in connection with protective coverings for other types of airfoils and other parts of aircraft and other structures where it is desired to control flow of air from one face of the covering to another for the purpose of maintaining the covering in a desired position despite the action of dynamic air forces upon the covering.

Variations may be made without departing from the scope of the invention as it is defined by the following claims.

I claim:

1. A protective covering for a surface, said covering comprising an elastic sheet body adapted to be mounted in stretched condition over said surface, said sheet body including a layer having a perforation, a reinforcement of textile material about said perforation, and a layer over said perforation and said reinforcement, said last-named layer having a slit extending across said perforation in the direction of stretch and being adhered to said reinforcement about the slitted area, said slit being effective to control flow of air through said covering.

2. A protective covering for a surface, said covering comprising an elastic sheet body adapted to be mounted in stretched condition over said surface, said sheet body including a layer having a perforation, a reinforcing tape of stretchable fabric extending over said perforation and being perforated to communicate therewith, and a layer over said tape, said last-named layer having a slit extending over said perforation in the direction of stretch and being adhered to said tape and the underlying layer about the slitted area, said slit being effective to control flow of air through said covering.

ROBERT G. CAMPBELL.

REFERENCES CITED

The following references are of record in the file of this patent:

UNITED STATES PATENTS

| Number | Name | Date |
|---|---|---|
| 2,168,012 | Waner | Aug. 1, 1938 |

FOREIGN PATENTS

| Number | Country | Date |
|---|---|---|
| 518,463 | Great Britain | Feb. 28, 1940 |